United States Patent [19]

Yamada

[11] 4,350,986

[45] * Sep. 21, 1982

[54] INK JET PRINTER

[75] Inventor: Takahiro Yamada, Hitachi, Japan

[73] Assignee: Hitachi, Ltd., Tokyo, Japan

[ * ] Notice: The portion of the term of this patent subsequent to Jan. 10, 1995, has been disclaimed.

[21] Appl. No.: 831,142

[22] Filed: Sep. 7, 1977

Related U.S. Application Data

[63] Continuation-in-part of Ser. No. 746,157, Nov. 30, 1976, Pat. No. 4,068,241.

[30] Foreign Application Priority Data

Sep. 11, 1976 [JP] Japan ............................... 51-109220

[51] Int. Cl.3 ............................................ G01D 15/18

[52] U.S. Cl. ...................................................... 346/75

[58] Field of Search .......................................... 346/75

[56] References Cited

U.S. PATENT DOCUMENTS

| | | | |
|---|---|---|---|
| 3,656,171 | 4/1972 | Robertson | 346/75 X |
| 4,050,077 | 9/1977 | Yamada et al. | 346/75 |
| 4,068,241 | 1/1978 | Yamada | 346/75 |

*Primary Examiner*—Joseph W. Hartary
*Attorney, Agent, or Firm*—Craig and Antonelli

[57] ABSTRACT

When an ink stream spouting from a nozzle is subjected to mechanical vibrations of a certain magnitude, the fore end of the ink stream alternately separates into larger and smaller ink droplets in synchronism with the vibrations. This invention varies the flight velocity of the small-diameter ink droplets relative to that of the large-diameter ink droplets according to information to-be-recorded and thus controls the union between the large- and small-diameter ink droplets. By exploiting the difference between the amounts of deflection of the large-diameter ink droplet and a united ink droplet created by the union of the large- and small-diameter ink droplets, the information is recorded on a recording medium.

7 Claims, 24 Drawing Figures

FIG. 14a
FIG. 14b
FIG. 14c
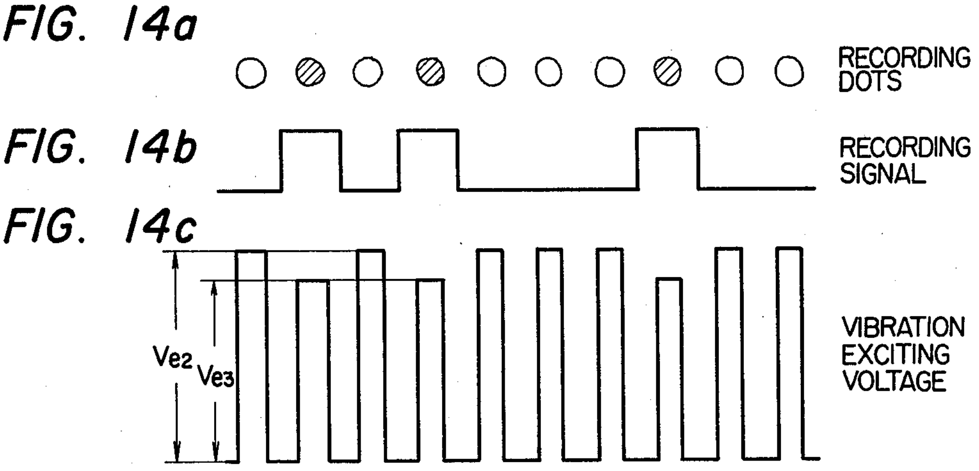
FIG. 15
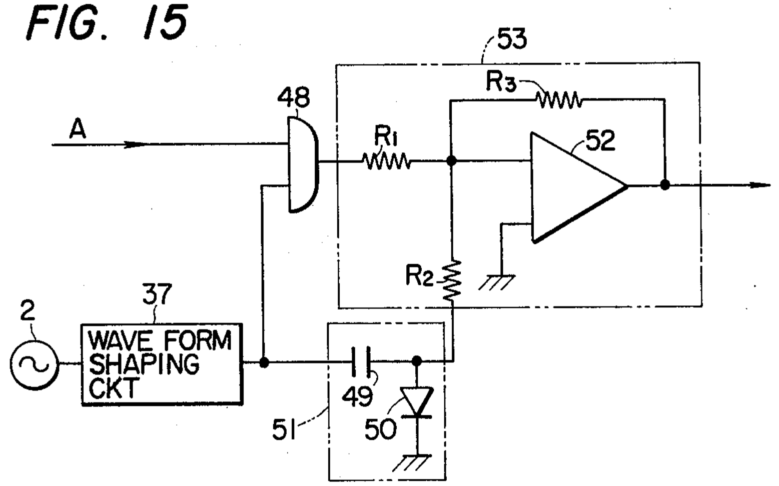

INK JET PRINTER

This application is a continuation-in-part application of copending application Ser. No. 746,157, filed Nov. 30, 1976, now U.S. Pat. No. 4,068,241.

BACKGROUND OF THE INVENTION

1. Field of the Invention

This invention relates to an ink jet printer, and more particularly to an ink jet printer wherein two sorts of droplets, larger and smaller diameter ink droplets, are spouted from a nozzle and the larger ink droplets are used for recording.

2. Description of the Prior Art

An ink jet printer deflects and controls ink droplets spouting from a nozzle, and records a dot pattern on a recording surface. As described in U.S. Pat. No. 3,596,275 (Richard G. Sweet, Application Ser. No. 354,659, Filed: Mar. 25, 1964, Patented: July 27, 1971), the ink jet printer applies mechanical vibrations to an ink stream formed by application of the ink under pressure to a nozzle so as to effect the generation of ink droplets in proper phase and also serves to control the application of charges to the ink droplets in accordance with electric signals for recording. Further, since the application of charges to the ink droplets is carried out by charging the ink stream in accordance with the recording electric signals, the ink must have a good conductivity, which places restrictions on the ink material which may be used. Still further, a high-frequency and high-voltage amplifier for producing the recording electric signals with a high fidelity was necessary.

DESCRIPTION OF RELATED APPLICATION

In order to solve such problems of the prior-art ink jet printer, there has been proposed an ink jet printer wherein large-diameter ink droplets and small-diameter ink droplets are alternately generated. Those ink droplets of small diameter which are unnecessary for recording are united with the large-diameter ink droplets, the united droplets being recovered, and only the desired ones of the small-diameter droplets are deposited on a recording surface so as to record information (Applicant: T. YAMADA, Ser. No. 746,157, Filed: Nov. 30, 1976, "INK JET RECORDING DEVICE", now U.S. Pat. No. 4,068,241). This ink jet printer previously proposed is very advantageous for recording information of small characters etc. at high resolution. For recording information of comparatively large characters etc., however, it has turned out to be disadvantageous on account of a low recording speed.

SUMMARY OF THE INVENTION

OBJECTS

An object of this invention is to provide an ink jet printer capable of information recording at high speed.

Another object of this invention is to provide an ink jet printer capable of high speed recording with a comparatively simple control circuit.

SUMMARY

According to this invention, the fore end of an ink stream spouting from a nozzle is separated into two sorts of droplets, larger and smaller ink droplets alternately and regularly disposed in the stream. Ink droplet deflecting means functions so that the amounts of deflection of the small-diameter ink droplet, the large-diameter ink droplet, and an ink droplet with the large- and small-diameter ink droplets united may become different, respectively. Shield means is disposed at a position at which, besides the small-diameter ink droplets, either the large-diameter ink droplets or the united ink droplets are intercepted. The flight velocity of the small-diameter ink droplet relative to that of the large-diameter ink droplet is controlled by an electric signal for recording, to control the union of the small-diameter ink droplet with the large-diameter ink droplet. Either the large-diameter sole ink droplet or the ink droplet with the large- and small-diameter ink droplets united avoids the shield means, and reaches the recording surface.

BRIEF DESCRIPTION OF THE DRAWINGS

FIGS. 14*a*–14*c* show another recording time chart; and

FIG. 15 is a circuit diagram of a modulation device.

DETAILED DESCRIPTION OF THE PREFERRED EMBODIMENTS

Figure 1:
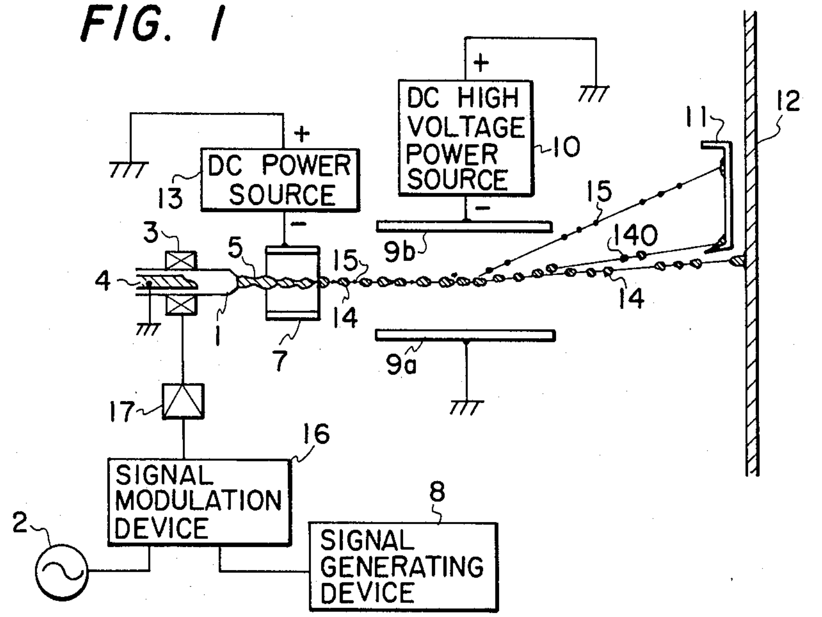
FIG. 1 is a schematic constructional view of an ink jet printer embodying this invention.

FIG. 1 shows the fundamental construction of an ink jet printer according to this invention. Pressurized ink 4 is guided to a nozzle 1 on which an electromechanical transducer 3 is mounted, and the ink is spouted from the nozzle hole as an ink stream. The electromechanical transducer 3 vibrates on the basis of an output signal of a high-frequency power source 2, to alternately separate the spouted ink stream into alternate, large-diameter ink droplets 14 and small-diameter ink droplets 15 which are emitted towards a recording medium 12. In the vicinity of the fore end of an ink stream 5 which extends a predetermined distance from the nozzle hole, a charging electrode 7 is situated so as to form an electrostatic capacitance between the ink stream 5 and the electrode 7. A DC high-voltage power source 13 for charging droplets is connected between the electrode 7 and the ink 4 supplied to the nozzle so as to apply charges to the large-diameter ink droplets 14 and small-diameter ink droplets 15. In order to establish an electric field which applies deflecting forces to the charged ink droplets 14 and 15, deflecting electrodes 9*a* and 9*b* are installed with the flight paths of the ink droplets 14 and 15 intervening therebetween, and a DC high-voltage power source 10 for deflection of the droplets is connected across these electrodes 9*a* and 9*b*. Thus, the large-diameter ink droplets 14 and the small-diameter ink droplets 15 are deflected in accordance with respective deflection characteristics during flight, and are separated from each other in a deflecting direction in amounts according to the flight distances (flight time). A modulation device 16 for modulating the vibration exciting electric signal, and an amplifier 17 for amplifying the vibration exciting electric signal are interposed between the high-frequency power source 2 and the electromechanical transducer 3. The signal modulation device 16 changes the magnitude of the vibration exciting electric signal on the basis of an electric signal from the generating device 8 for generating a recording electric signal so as to change the flight velocity of the small-diameter ink droplets 15. Shield means 11 for intercepting selected ink droplets is installed at a position at which the flight paths of the small-diameter ink droplets 15 and ink droplets 140 created by the union between the large- and small-diameter ink droplets are to be blocked.

Description will now be made of a technique for separating the ink into the large-diameter ink droplet 14 and the small-diameter ink droplet 15 alternately and regularly.

Figure 2:
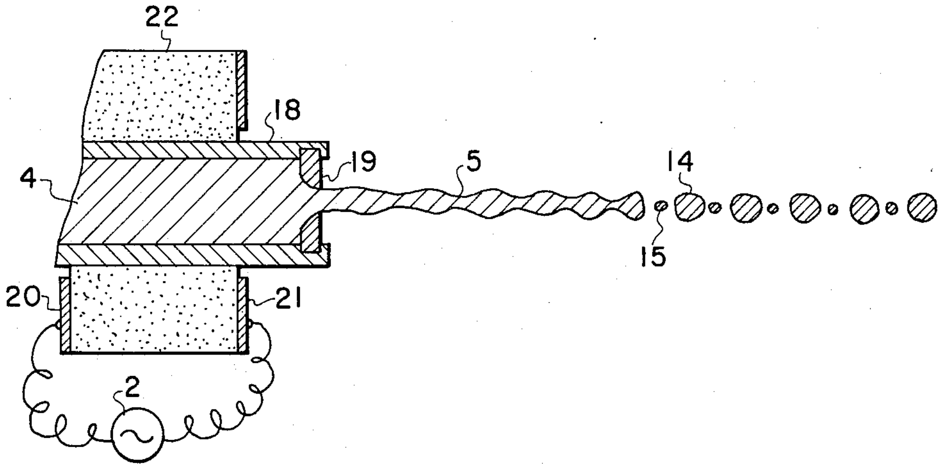
FIG. 2 is a diagrammatic view for explaining the state in which ink droplets are formed in the vicinity of a nozzle.
Figure 3:
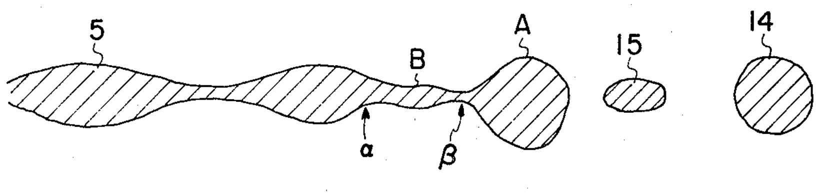
FIG. 3 is a diagrammatic view showing the surface profile of an ink stream near its fore end.

FIG. 2 illustrates the state in which the ink droplets are formed. The nozzle 1 has a metallic pipe 18 to which ink under pressure is applied and an orifice 19 for spouting the ink in the form of a stream. The electromechanical transducer 3 has disposed thereabout a PZT piezo-vibrator 22, and electrodes 20 and 21 are joined on both the end faces of the transducer 3. By spouting from the nozzle hole the ink 4 pressurized up to a predetermined pressure with a pump or the like, an ink stream 5 in the shape of an elongate circular cylinder can be formed. On the other hand, the piezo-vibrator 22 is energized for vibrations by a high-frequency signal voltage at a fixed frequency, and the vibrations act on the ink stream 5. When the properties of the ink, such as surface tension and viscosity, the diameter of the nozzle hole (the diameter of the ink stream), the feed pressure of the ink to the nozzle 1 (the ink spouting velocity), the vibration exciting frequency, the vibration exciting intensity, etc. are predetermined values, minute deformations in radial directions can be caused to appear in the ink stream 5 due to the vibrations. The minute deformations move with the flow of the ink stream 5, and grow as they advance to the fore end part of the ink stream. In consequence, the fore end of the ink stream is alternately separated into large-diameter ink droplets 14 and small-diameter ink droplets 15 at a rate of one pair of large- and small-diameter ink droplets generated during each vibration exciting period. The flight velocities of the ink droplets 14 and 15 become substantially equal to the jet velocity of the ink 4 from the nozzle hole. This phenomenon in which the larger and smaller ink droplets 14 and 15 are alternately generated is a nonlinear phenomenon which ought to arise owing to the development of the deformations (constricted parts) in the ink stream 5. The generation of these larger and smaller droplets is illustrated in FIG. 3 on an enlarged scale. More specifically, the surface profile of the ink stream 5 near its fore end is as shown in FIG. 3, and severance at points $\alpha$ and $\beta$ takes place. In this manner, a portion A of the ink stream forms the large-diameter ink droplet 14, and a portion B of the ink stream forms the small-diameter ink droplet 15. Although, as to the nonlinear phenomenon, the energy conversion from the fundamental wave and lower harmonics into higher harmonics as has occurred in the ink stream 5 is thought the main cause, the perfect theoretical analysis has not been made yet. The inventors, however, have confirmed stable and reliable generation of such larger and smaller ink droplets 14 and 15 in the manner described. By way of example, in the case where ink exhibiting a surface tension of 56 dyn/cm, a viscosity of 2 cp, and a specific gravity of 1 was used, where a nozzle 1 having a hole diameter of 240 $\mu$m was employed and where the vibration exciting frequency was set at 7.2 kHz (the large- and small-diameter ink droplets were generated at 7.2 kHz), large-diameter ink droplets 14 having a diameter of 420 $\mu$m and small-diameter ink droplets 15 having a diameter of 210 $\mu$m could be alternately and reliably generated under conditions of an ink supply pressure of 0.7 kg/cm$^2$ and a vibration exciting voltage of 10 $V_{pp}$–30 $V_{pp}$.

Now, description will be made of the function of means for varying the flight velocity of the small-diameter droplet relative to that of the large-diameter droplet and accordingly varying the situation of the union between the large- and small-diameter droplets in response to the recording input signal.

In the means for forming the ink droplets and causing them to start and fly as explained with reference to FIG. 2, the vibration exciting voltage to be applied to the PZT piezo-vibrator 22 is varied so that the intensity of vibrations to act on the ink stream 5 is varied, with the other ink droplet forming conditions being held constant. Thus, the flight velocity of the small-diameter ink droplets 15 can be varied relative to that of the large-diameter ink droplets 14.

Figure 4A:
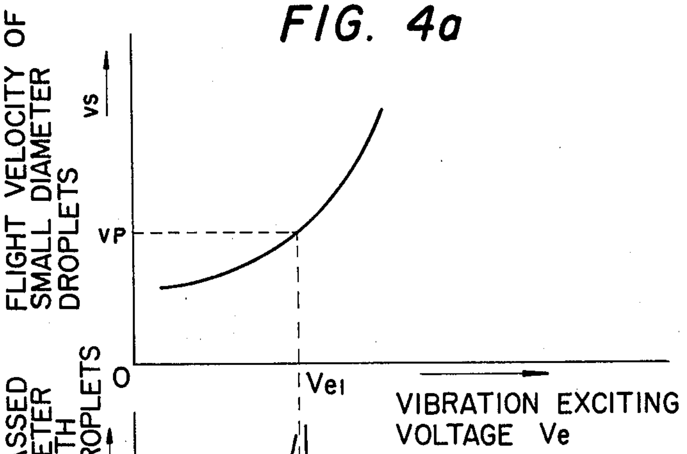
FIG. 4*a* is a characteristic diagram showing the relationship between the vibration exciting voltage and the flight velocity of a small-diameter droplet.

This state is illustrated in FIG. 4*a*. As seen from a characteristic curve in the figure, when the vibration exciting voltage $V_e$ is selected at a value $V_{el}$, the flight velocity $v_s$ of the small-diameter ink droplets 15 is equal to the flight velocity $v_p$ of the large-diameter ink droplets 14. As the vibration exciting voltage becomes greater than the value $V_{el}$, the flight velocity of the small-diameter ink droplets 15 becomes higher, and as the former becomes smaller, the latter becomes lower.

By way of example, under the foregoing ink droplet forming conditions of forming the larger ink droplets 14 of about 420 $\mu$m in diameter and the smaller ink droplets 15 of about 210 $\mu$m in diameter in numbers of $7.2\times10^3$ per second, the flight velocity of the small-diameter ink droplets 15 can be varied from 10.6 m/s to 11.9 m/s relative to the flight velocity 11 m/s of the large-diameter ink droplets 14 in correspondence with the variations of the vibration exciting voltage from 12 $V_{pp}$ to 30 $V_{pp}$.

The velocity variations owing to the vibration exciting voltage variations as described above, that is, the variations of the flight velocity of the small-diameter ink droplets relative to the substantially constant flight velocity of the large-diameter ink droplets, bring forth changes in the way in which the large- and small-diameter ink droplets overtake each other. Further, they change the distance through which the small-diameter ink droplet 15 flies before uniting with the large-diameter ink droplet 14, that is, the distance d in FIG. 4*b* and FIGS. 5*b* and 5*c*.

Figure 4B:
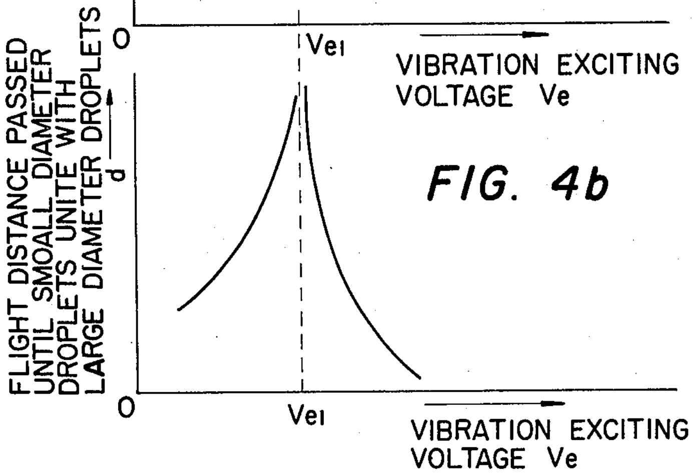
FIG. 4*b* is a characteristic diagram showing the relationship between the vibration exciting voltage and the flight distance by which the small-diameter ink droplet passes before uniting with a large-diameter ink droplet.
Figure 5A:
FIGS. 5*a*–5*c* are diagrammatic views of the flight states of the ink droplets, respectively.
Figure 5B:
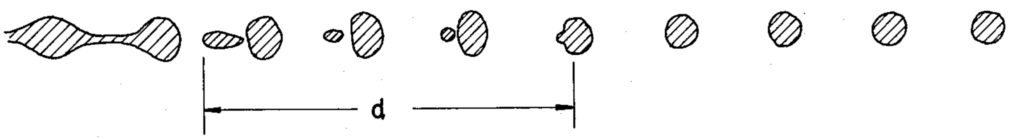
Figure 5C:

More specifically, in that region in FIGS. 4*a* and 4*b* in which the vibration exciting voltage is lower than the voltage $V_{el}$, $v_s < v_p$. The ink droplet flight state at this time is such that, as illustrated in FIG. 5*c*, the small-diameter ink droplet 15 is overtaken by the large-diameter ink droplet 14 to unite therewith. With increase in the vibration exciting voltage, the difference between the flight velocities of both the ink droplets becomes smaller. As the result, a longer time is required for the union, and the ink droplet flight distance d through which the small-diameter ink droplet 15 flies before uniting with the large-diameter ink droplet 14 becomes longer as indicated in FIG. 4*b*. When the vibration exciting voltage becomes $V_{el}$, $v_s = v_p$. Then, the large- and small-diameter ink droplets do not unite, and they fly in parallel as illustrated in FIG. 5*a*.

Further, when the vibration exciting voltage becomes higher than the voltage $V_{el}$, $v_s > v_p$ results contrary to the foregoing. At this time, the small-diameter ink droplet 15 overtakes the large-diameter ink droplet 14 as shown in FIG. 5*b*. With increase in the vibration exciting voltage, the difference between the flight velocities of the small- and large-diameter ink droplets becomes greater. As seen from FIG. 4*b*, therefore, the ink droplet flight distance before the union of the drops becomes shorter and finally comes close to zero.

This characteristic is concerned with the severance characteristic of the stream at the severing points $\alpha$ and $\beta$ as depicted in FIG. 3 on the formation of the larger and smaller ink droplets, and more particularly, with the order of severance as to which of the severing points undergoes severance earlier and with the difference or interval between the times of severance at the two points. That is, in the case where the severance takes place at the point $\alpha$ first and at the point $\beta$ subsequently, the flight velocity $v_s$ of the small-diameter ink droplet 15 becomes higher than the flight velocity $v_p$ of the large-diameter ink droplet 14. Conversely, in case where the severance occurs at the point $\beta$ and subsequently at the point $\alpha$, the flight velocity of the small-diameter ink droplet 15 becomes lower than that of the large-diameter ink droplet 14. As the difference between the times of severance at the respective points $\alpha$ and $\beta$ is greater, the difference between the respective flight velocities of the small- and large-diameter ink droplets becomes greater. In the case where severance occurs simultaneously at both the points, the flight velocities of both the ink droplets become equal. It is accordingly considered that surface tensions acting at the parts of severance that is, at the points $\alpha$ and $\beta$, will give rise to such a characteristic.

Further, the inventors have confirmed that one cycle of such process of severing the ink droplets corresponds to one cycle of the vibration excitation for the ink stream, i.e., the vibration exciting voltage for the piezo-vibrator, and that by varying the intensity of each cycle of the vibration excitation, it is possible to develop the constriction of the ink stream caused by the vibration, to induce a droplet severing process corresponding to the particular intensity of the vibration excitation, and to vary and control the flight velocity of the corresponding small-diameter ink droplet 15 relative to the substantially constant flight velocity of the large-diameter ink droplet 14.

Accordingly, the flight velocities of the individual ink droplets for forming recording dots can be reliably controlled in such a way that the vibration exciting input from the high-frequency power source 2 in FIG. 1 is controlled by the vibration exciting electric input-modulating device 16 for every cycle of the vibration excitation and on the basis of the recording signal input from the recording signal source 8.

Description will now be made of the operation of means for separating the respective prearranged flight paths of the large-diameter ink droplet 14, the small-diameter ink droplet 15, and the ink droplet 140 formed by the large- and small-diameter droplets united (the united droplet).

In FIG. 1, the charging electrode 7 is maintained at a fixed potential by the applied DC voltage and is placed in the vicinity of the fore end part of the ink stream 5. Therefore, a gradient of electric field is established between the fore end part of the ink stream and the charging electrode, and therefore charges can be electrostatically induced in the fore end part of the ink stream. Accordingly, the ink droplets created from the fore end part of the ink stream are emitted with charges corresponding to the sizes thereof. At this time, the quantities of the charges on the droplets are substantially proportional to the diameters thereof. When the large-diameter droplet 14 is 420 μm in diameter and the small-diameter droplet 15 is 210 μm, the ratio between the quantities of charges thereon becomes about 2:1. The ratio between the quantities on charges of the united ink droplets 140 created by the union of the large- and small-diameter droplets thus charged and the small-diameter droplet 15 becomes 3:1.

As illustrated in FIG. 1, the ink droplets charged in this manner come to fly within the electrostatic field established by the deflecting electrodes 9*a* and 9*b* and are therefore subjected to deflections. The quantities of deflection D at this time become, when determining the dimensions of various parts as given in FIG. 6, as follows:

$$D = \frac{1}{2}\frac{EQ}{M}\left(\frac{b}{v}\right)^2\left(1 + \frac{2L}{b}\right)$$

where E denotes the intensity of a deflecting electrostatic field 23, Q the quantity of charges on the ink droplet, M the mass of the ink droplet, v the flight velocity of the ink droplet, b the distance or extent of the deflecting electric field, and L the distance from the downstream end of the deflecting electric field to the droplet terminating spot.

Among the physical quantities, E, b and L are constant, and v does not appreciably differ for the large-diameter ink droplet 14, small-diameter ink droplet 15 and united ink droplet 140. Therefore, the quantity of deflection D is substantially proportional to Q/M. Let's consider by way of example the case where the respective diameters of the large-diameter ink droplet 14 and small-diameter ink droplet 15 are 420 μm and 210 μm.

With the foregoing charging means, the ratio among the respective quantities of charges of the large-diameter ink droplet 14, small-diameter ink droplet 15 and united ink droplet 140 becomes 2:1:3 as stated previously. On the other hand, the ratio among the respective masses is 8:1:9. Accordingly, the ratio among the quantities of deflection D becomes $\frac{1}{4}$:1:$\frac{1}{3}$.

Figure 6:
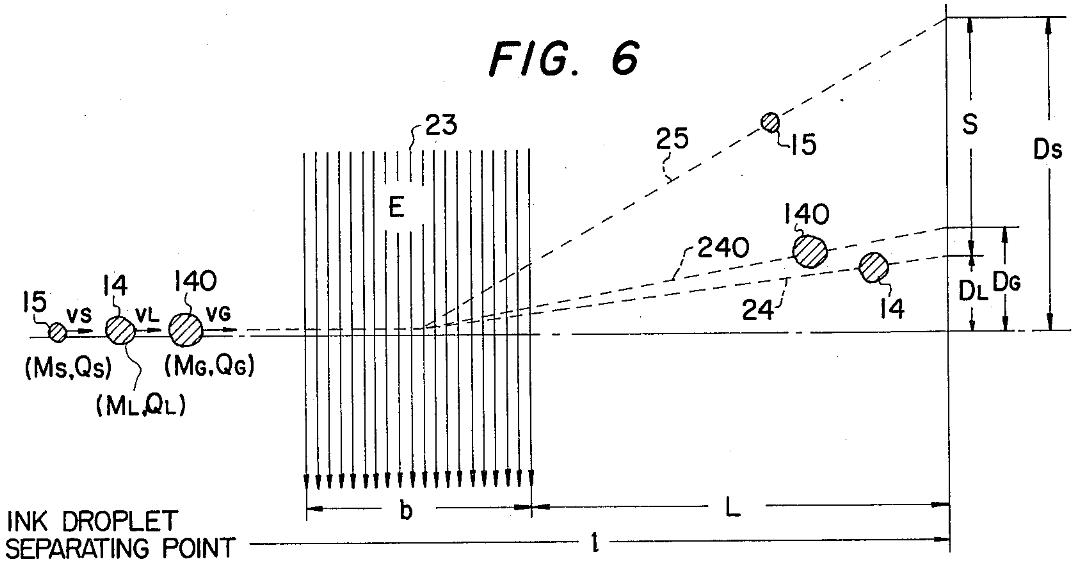
FIG. 6 is diagrammatic view of the deflected states of the ink droplets.
Figure 7A:
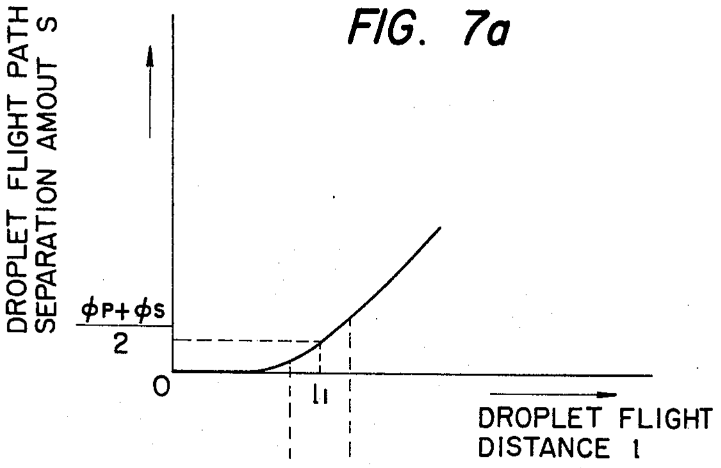
FIG. 7*a* is a characteristic diagram showing the relationship between the ink droplet flight distance and the amount of separation of ink droplet flight paths.
Figure 7B:
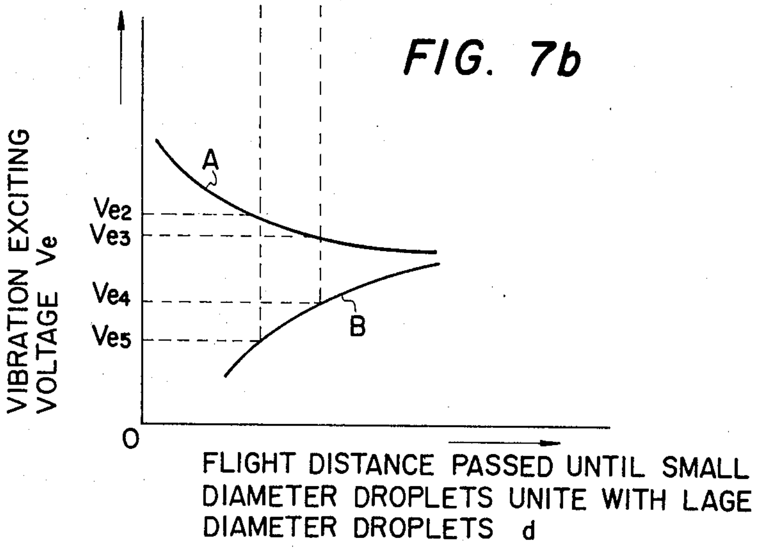
FIG. 7*b* is a characteristic diagram showing the relationship between the flight distance by which the small-diameter ink droplet passes before uniting with the large-diameter ink droplet and the vibration exciting voltage.
Figure 8A:
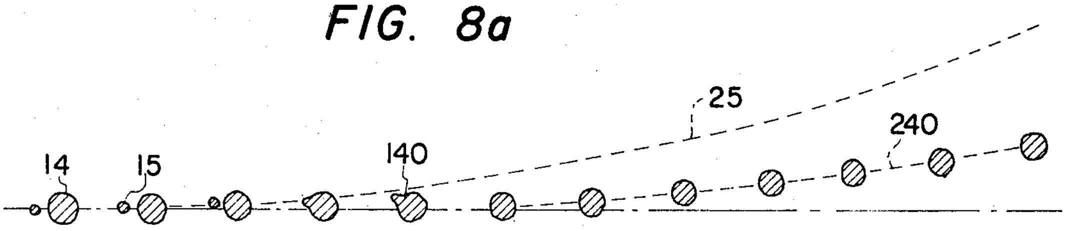
FIG. 8*a* is a diagrammatic view showing the flight path of an ink droplet with the large- and small-diameter droplets united.
Figure 8B:
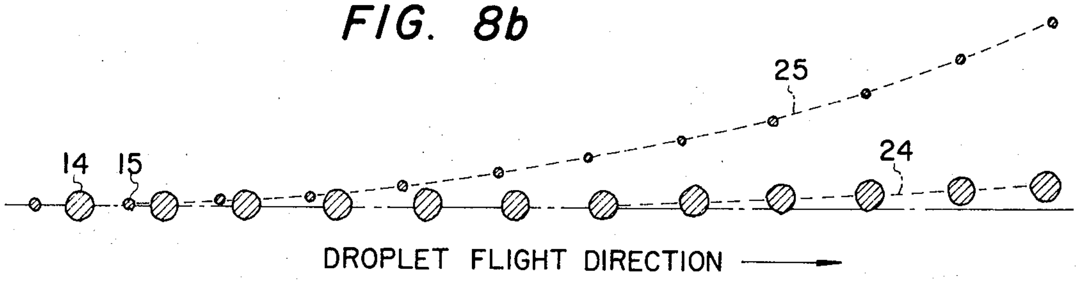
FIG. 8*b* is a diagrammatic view showing the flight paths of the small-diameter ink droplet and the large-diameter sole ink droplet.

In consequence, the respective flight paths of the large-diameter ink droplet 14, small-diameter ink droplet 15 and united ink droplet 140 become as indicated at 24, 25 and 240 in FIG. 6, which shows that the respective prearranged flight paths can be separated.

As thus far described, the means for charging the ink droplets and the means for deflecting the charged ink droplets constitute the means for separating the respective flight paths of the large-diameter ink droplet 14, small-diameter ink droplet 15 and united ink droplet 140 by amounts corresponding to the droplet flight distance (flight time).

Hereunder will be described the principle of a recording operation, i.e., how the recording is executed by combining the operations of the various means explained above, with the operation of means for intercepting those ink droplets which are unnecessary for the recording.

That amount of separation of the flight paths S indicated in FIG. 6 to which the respective flight paths of the large-diameter ink droplet 14 and the small-diameter ink droplet 15 are subjected by the foregoing separation means varies as in FIG. *7a* versus the ink droplet flight distance l.

Now, let $\phi_p$ and $\phi_s$ denote the respective diameters of the large-diameter ink droplet 14 and the small-diameter ink droplet 15, and $l_1$ denote the ink droplet flight distance required for the flight path separation amount S to become $(\phi_p+\phi_s)/2$. When the flight velocity of the small-diameter ink droplets 15 is controlled by the vibration exciting intensity so that the large-diameter ink droplet 14 may overtake, or conversely be overtaken by, the small-diameter ink droplet 15 substantially before the specified distance $l_1$, the small-diameter ink droplets 15 do not follows an independent flight path 25 and the united ink droplets 140 are formed as shown in FIG. *8a*. The ink droplets 140 proceed along the predetermined flight path 240. As illustrated in FIG. 1, the shield means 11 is installed in front of the surface of the recording medium so as to intercept the flight path which the small-diameter ink droplets 15 trace and the flight path which the united ink droplets 140 trace. In this case, accordingly, no droplet is deposited on the recording medium.

On the other hand, when the flight velocity of the small-diameter ink droplets 15 is controlled by the vibration exciting intensity so that the large-diameter ink droplet 14 may overtake, or conversely be overtaken by, the small-diameter ink droplet 15 at a droplet terminating spot beyond the specified distance $l_1$, the separation between the flight path 25 of the small-diameter ink droplets 15 and the flight path 24 of the large-diameter ink droplets 14 is sufficient to provide clearance at the prearranged uniting spot of the larger and smaller ink droplets as illustrated in FIG. *8b*. Accordingly, the small-diameter ink droplets 15 no longer unite with the large-diameter ink droplets 14, and they do not form the united droplets 140. Thus, the large-diameter droplets and the small-diameter droplets follow independent flight paths respectively. In this case, as depicted in FIG. 1, the large-diameter ink droplets 14 can form the recording dots on the surface of the recording medium without being intercepted by the shield means 11. The small-diameter ink droplets 15 which are unnecessary for the recording are intercepted by the shield means 11, and do not reach the recording medium 12.

Accordingly, the control of the deposition of such large-diameter ink droplets 14 onto the surface of the recording medium can be carried out by the control of the vibration exciting voltage. More specifically, referring to FIG. *7b* which is essentially the same graph as in FIG. 4, in the case of utilizing a $V_e-d$ characteristic curve A according to which the small-diameter ink droplets 15 overtake the large-diameter ink droplets 14 to create the united ink droplets 140, the large-diameter ink droplets 14 can be prevented from reaching the recording medium by selecting the vibration exciting voltage at, e.g., $V_{e2}$. By selecting the vibration exciting voltage at $V_{e3}$, it is possible to deposit the large-diameter ink droplets 14 onto the recording medium and to form the recording dots. The recording accordingly becomes possible in such a way that, in correspondence with a recording input signal in FIG. *9b* according to which the recording dots are formed at hatched parts in FIG. *9a*, the vibration exciting voltage waveform for the piezo-vibrator is provided as given in FIG. *9c*, its amplitude being changed-over between the values $V_{e2}$ and $V_{e3}$. Further, in the case of utilizing a $V_e-d$ characteristic curve B according to which the small-diameter ink droplets 15 are overtaken by the large-diameter ink droplets 14 to create the united ink droplets 140, the large-diameter ink droplets 14 can be prevented from reaching the recording medium by selecting the vibration exciting voltage at, e.g., $V_{e5}$, and the large-diameter ink droplets 14 can be deposited onto the recording medium to form the recording dots by selecting the vibration exciting voltage at, e.g., $V_{e4}$. In this case, accordingly, the intended recording can be performed in such a way that the vibration exciting voltage waveform is provided as shown in FIG. *9d* in correspondence with the recording input signal in FIG. *9b*.

The vibration exciting voltage including the recording information as shown in FIG. *9c* or FIG. *9d* is obtained in such a way that the amplitude of a sinusoidal wave from the high-frequency power source 2 is amplitude-modulated with the vibration exciting electric input-modulating unit 16, constructed of multipliers etc., by a recording input signal from the recording input signal source 8, which signal has as its unit a pulse signal having a period equal to one cycle of vibration excitation corresponding to one small-diameter ink droplet and is synchronous with the high-frequency power source 2 shown in FIG. 1.

The inventors fabricated an equipment with which the large-diameter ink droplets 14 being about 420 μm in diameter and the small-diameter ink droplets 15 being about 210 μm in diameter were formed as charged droplets in numbers of $7.2\times10^3$ per second under the droplet forming conditions previously described and by applying a charging voltage of about 500 $V_{DC}$ to the charging electrode having a gap of 3.5 mm, and with which the droplets were passed within an electrostatic field established by applying a deflecting voltage of 4 $kV_{DC}$ across the deflecting electrodes made up of two parallel plates being 20 mm long and spaced 7 mm. According to the equipment, the control of the deposition of the large-diameter ink droplets 14 onto the recording medium 12 as explained above was possible for a condition under which the vibration exciting voltages $V_{e2}$ and $V_{e3}$ in FIG. 9c to be supplied to the PZT piezo-vibrator 3 mounted on the nozzle were selected at about 25 V and about 20 V respectively.

Figure 10:
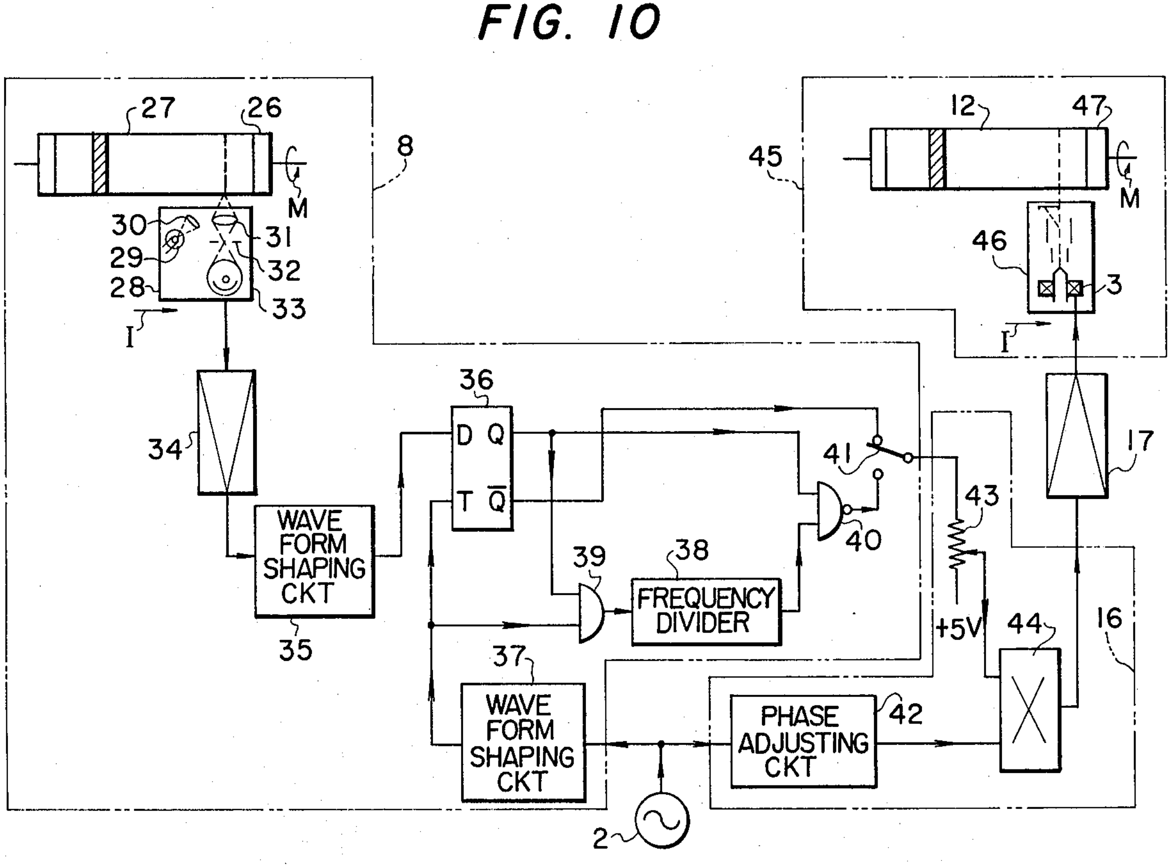
FIG. 10 is a schematic diagram of a facsimile system to which the ink jet printer of this invention is applied.

An example in the case where the printer according to the embodiment of this invention set forth above was applied to a facsimile is shown in FIG. 10, including a recording inut signal source (transmitter). Hereunder, description will be made with reference to this figure.

In the recording input signal source 8, numeral 26 designates a rotary drum for transmission. The rotary drum 26 has an original picture 27 wound thereon, and is rotated in the direction of arrow M indicated in the figure. Shown at 28 is an optical system, which functions as described below. Light from a light source 29 is condensed by a condensing lens 30, and illuminates the original picture 27. Reflected light from the original picture 27 is received by an objective 31. It is guided through a slit 32 to a photoelectric detector device 33, such as photomultiplier tube and phototransistor, and is converted into an electric signal therein.

The optical system 28 is driven in the axial direction of the rotary drum 26, and sequentially scans the original picture 27 from one end thereof. The signals obtained in this way are passed through an amplifier 34 as well as a waveform shaping circuit 35, where they are turned into two-valued signals of predetermined levels representative of white and black. The picture signals thus obtained are led to a D-type flip-flop 36. Outputs of the flip-flop 36 are controlled by clock pulses derived from the output of the high-frequency power source 2 through a waveform shaping circuit 37, such as Schmitt circuit. In this manner, there are obtained the recording input signals whose unit is a pulse signal having a width equivalent to one cycle of vibration excitation corresponding to one small-diameter ink droplet, which recording input signals are synchronous with the high-frequency power source 2. In the case where the number of ink droplets generated is too large to form a picture, or for the purpose of lessening the degradation of the recording picture quality due to the mutual interference of a number of droplets created in succession, every second one of the droplets created or every one of an even multiple of the droplets created is used for the recording. For such purpose, a frequency divider circuit is provided for thinning out the stream a NAND circuit 39 as well as a NAND circuit 40 are combined with the circuit 38 as illustrated in the figure, and a change-over switch 41 is operated, whereby the intended recording input signal can be obtained either from the output of flip-flop 36 when all droplets are desired or from the gate 40 when a thinned stream is desired.

Figure 9A:
FIGS. 9*a*–9*d* show a recording time chart.
Figure 9B:
Figure 9C:
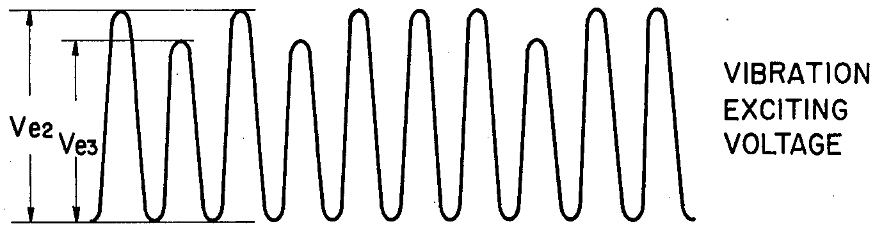
Figure 9D:
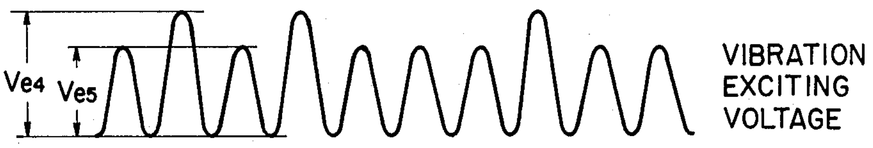

The recording input signal thus obtained is applied to the vibration exciting electric input-modulating unit 16. The sinusoidal wave which has been adjusted to a predetermined phase by a phase adjusting circuit 42, and the recording input signal whose magnitude has been adjusted to a predetermined value by a modulation level-adjusting variable resistor 43 are multiplied by means of a multiplier unit 44 to amplitude-modulate the sinusoidal wave in accordance with the recording input signal. The resultant signal is amplified up to a predetermined value by the vibration exciting electric input amplifier 17. Then, the vibration exciting signal to be fed to the PZT piezo-vibrator 3 as shown in FIG. 9c can be obtained.

An ink droplet control system 46 of a printer 45 whose recording operation has been described in detail previously receives the vibration exciting signal and forms the recording dots according to the recording input signal on the recording paper 12 wound on a recording rotary drum 47. The recording drum 47 is rotated in the direction of arrow M in FIG. 10 in synchronism with the rotary drum 26 having the original picture wound thereon and at the same speed as that of the latter drum. The ink droplet control system 46 is driven in the direction of arrow I in the figure at the same speed as that of the optical system 28. Thus, the recording paper 12 is sequentially scanned from one end thereof in the same manner as the original picture is sequentially scanned by the optical system 28. Accordingly, a recorded picture which consists of an aggregate of the recording dots of the ink droplets can be obtained on the recording paper 12.

In the embodiments described above, the means for separating the respective flight paths of the large-diameter ink droplets 14, small-diameter ink droplets 15 and united ink droplets 140 by an amount corresponding to the flight distance of the ink droplets is made up of the means for charging the ink droplets and the means for electrostatically deflecting the charge droplets. Moreover, as understood from FIG. 1, the constituent means are constructed so as to operate independently.

Figure 11:
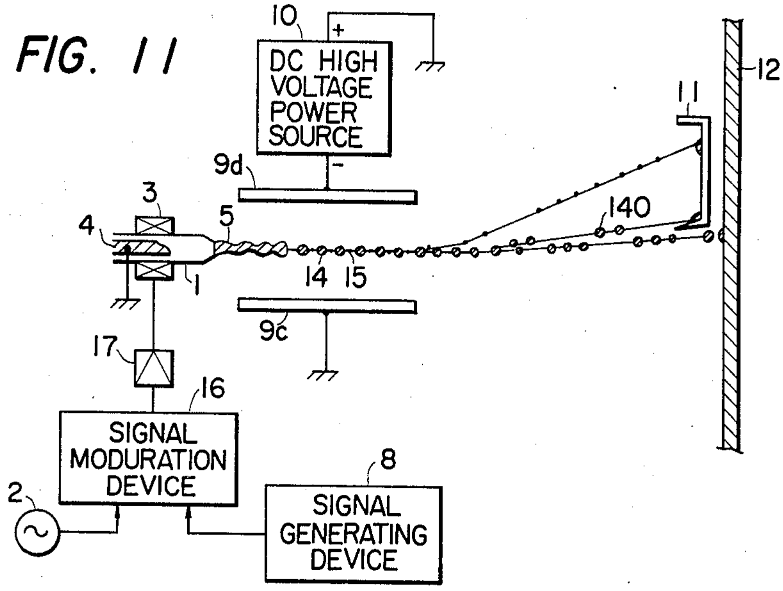
FIGS. 11–13 are schematic diagrams of ink jet printers showing further embodiments.
Figure 12:
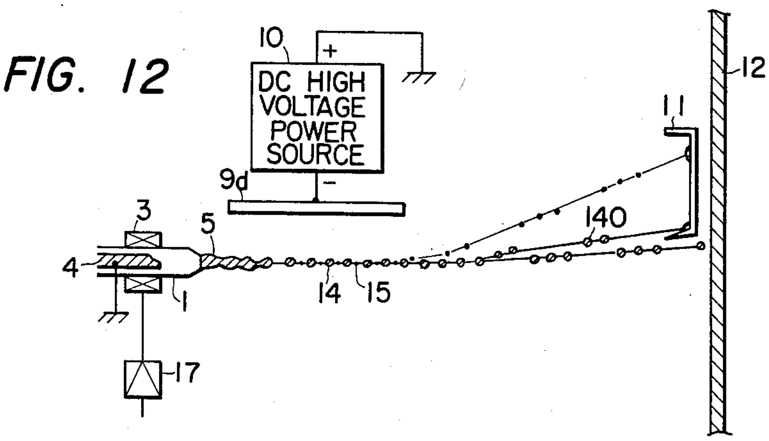

In contrast, embodiments shown in FIG. 11 and FIG. 12 are of a system wherein a single means serves both as the charging means and as the deflecting means. Hereunder, these embodiments will be explained.

In FIG. 11, numerals 9c, 9d designate respective deflecting electrodes, and a DC high-voltage source 10 is connected therewith. Although they are similar to those employed in FIG. 1, they are installed nearer to the nozzle 1 than in the case of the embodiment shown in FIG. 1. Thus, an electrostatic field established by the electrodes 9c, 9d acts also on the ink stream 5. Accordingly, the ink droplets created are charged to a positive polarity in the case of this embodiment under the action of the electric field, and they are subject to deflecting forces under the action of the electrostatic field established by the same deflecting electrodes 9c, 9d. Further, the printer can be similarly constructed even when the electrode 9c on the ground side in FIG. 11 is omitted as illustrated in FIG. 12. In both the cases, the vibration exciting intensity is controlled as in the case of FIG. 1.

In this manner, with the embodiments of FIGS. 11 and 12, the charging electrode and the ink droplet charging power source, as provided in the embodiment of FIG. 1, are unnecessary, so the structure is simple and that the device can be constructed at low cost. Moreover, since the distance through which the ink droplets fly before depositing onto the recording medium can be shortened, the disturbance to which the ink droplets are subjected during flight can be reduced, which is advantageous for performing recording with high fidelity. In addition, delicate adjustments for forming the ink droplets within a charging electrode having a narrow interspace are dispensed with, which facilitates the adjustments of the flight path positions of the ink droplets.

In the above, description has been made of a system wherein large-diameter ink droplets 14, small-diameter ink droplets 15 and united ink droplets 140 are created, and the large-diameter ink droplets 14 are used for the recording. However a system wherein the recording is performed with the united ink droplets 140 is easily suggested as a modified embodiment of this invention.

Figure 13:
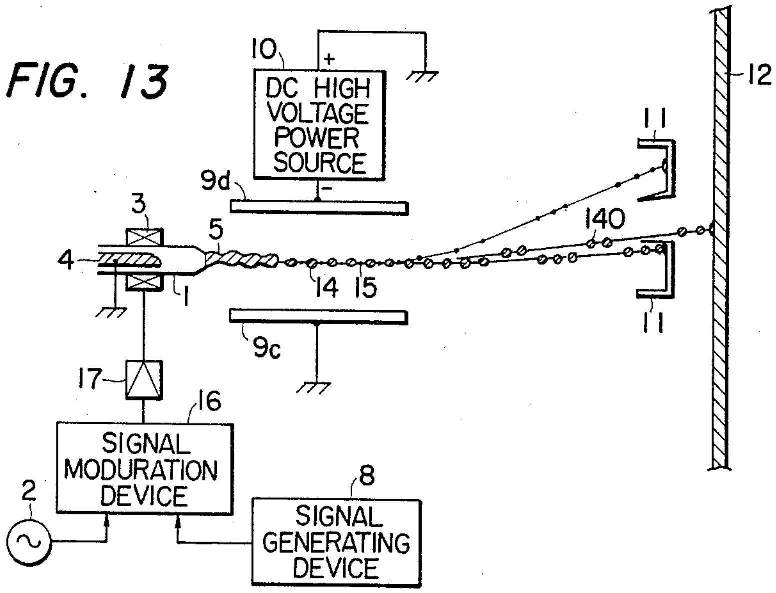

Hereunder, this embodiment will be explained with reference to FIG. 13.

A great difference in this embodiment from the foregoing embodiments in FIGS. 1, 11 and 12 in which the recording is executed with the large-diameter ink droplets 14 lies in the construction of the shield means 11 for catching the droplets which are not conducted onto the recording medium and employed for forming the recording dots, that is, the small-diameter ink droplets 15 and the large-diameter ink droplets 14.

According to the present embodiment, the shield means 11 is provided so as to intercept the flight path of the large-diameter ink droplets 14 and that of the small-diameter ink droplets 15. On the other hand, the flight path of the united ink droplets 140 is adapted to reach the recording medium 12.

In case where the recording dots are to be formed on the recording medium, the flight velocity of the small-diameter ink droplets 15 is set so that the small-diameter ink droplets 15 may unite with the large-diameter ink droplets 14. Conversely, in the case where no recording dot is to be formed, the flight velocity of the small-diameter ink droplets 15 is set so that the small-diameter ink droplets 15 will not unite with the large-diameter ink droplets 14.

The control which determines whether or not the large- and small-diameter ink droplets are to be united is carried out in the same way as previously stated by the means for generating the large- and small-diameter ink droplets, the means for varying the velocity of the small-diameter ink droplets 15 relative to that of the large-diameter ink droplets 14, and the means for separating the respective flight paths of the large-diameter ink droplets 14 and the small-diameter ink droplets 15.

It will therefore be readily understood from the preceding explanation that the control of the magnitude of the vibration exciting voltage may be effected in a reverse manner to that in the case of recording with the large-diameter ink droplets 14.

By the way, the means for varying the flight velocity of the small-diameter ink droplets 15 relative to that of the large-diameter ink droplets 14 operates to vary the intensity of vibrations which act on the ink stream, according to a recording signal. In the foregoing, as shown in FIG. 1 as one embodiment thereof, this means has been of the type wherein the vibration exciting voltage for the vibrator 3 mounted on the nozzle 1 is provided as a sinusoidal wave voltage, the amplitude of which is amplitude-modulated according to the recording signal as illustrated in FIGS. *9a–9d*.

The vibration exciting voltage waveform for the vibrator, however, need not be sinusoidal, but it may well be a rectangular wave whose amplitude varies according to a recording signal, as shown in FIG. 14*c*.

In this case, the modulation device can be constructed comparatively simply. FIG. 15 shows an example thereof.

It can be constructed of an AND circuit 48, a clamp circuit 51 consisting of a capacitor 49 and a diode 50, and an adder circuit 53 made up of an operational amplifier 52 and resistances $R_1$, $R_2$ and $R_3$.

In operation, a recording signal input A synchronous with the high-frequency power source 2 and clock pulses produced by applying an output from the high-frequency power source 2 through a waveform shaping circuit, such as Schmitt circuit, 37 are subjected to an AND operation in the AND circuit 48. The resultant signal and the clock pulses put into the negative polarity by the clamp circuit 51 are added by the adder circuit 53 so as to obtain an amplitude-modulated recording signal. The ratio between the resistances $R_1$ and $R_2$ is set and held at an appropriate value so as to provide a predetermined amount of modulation.

In the ink jet recording system according to this invention as set forth above, it is unnecessary to control the quantity of charges to be bestowed on recording liquid droplets as in the prior-art ink jet recording system described previously. Accordingly, it is not necessary to provide an expensive and complicated automatic phasing device for continually maintaining an appropriate relation between the phase of forming the recording liquid droplets and the phase of a recording input signal to be applied to a charging electrode. In addition, the recording liquid need not especially be electrically conductive and is easy to produce. The recording liquid material can be selected from a wider range, more media permit the recording, and the recording liquid becomes as cheap as ordinary ink. Furthermore, the charging voltage for charging the recording liquid droplets is a DC voltage, and it is unnecessary to impress a high-voltage and high-speed pulse signal on the charging electrode, which brings forth the advantage that an expensive amplifier as well as power source need not be used.

I claim:

1. An ink jet printer, comprising:

nozzle means for emitting pressurized ink in a stream towards a recording surface, vibration exciting means connected to said nozzle means for applying to the ink mechanical vibrations of a magnitude at which said ink stream severs alternately into large-diameter ink droplets and small-diameter ink droplets at a fore end part thereof, means for generating a recording electric signal, control means for varying the vibration exciting intensity of said vibration exciting means on the basis of said recording electric signal, so as to control the relative flight velocities of the large-diameter ink droplets and the small-diameter ink droplets and thereby to control the position of possible union of said small-diameter ink droplets with said large-diameter ink droplets, deflection means acting on the ink droplet flight paths so that said large-diameter ink droplets, said small-diameter ink droplets and united ink droplets formed by said large- and small-diameter ink droplets uniting may proceed along respectively different flight paths, and shield means for intercepting the flight path of either of said large-diameter ink droplets and the united ink droplets and the flight path of said small-diameter ink droplets, said control means including means for varying the vibration exciting intensity in response to the recording electric signal so that the ink droplets corresponding to recording dots may avoid said shield means and reach the recording surface.

2. An ink jet printer according to claim 1, wherein said shield means is installed on a position at which said flight path of said small-diameter ink droplets and said flight path of said united ink droplets are intercepted, and said control means varies the vibration exciting intensity in response to the recording electric signal so that said small-diameter ink droplets may be united during flight with those large-diameter ink droplets that are unnecessary for the recording.

3. An ink jet printer according to claim 1, wherein said shield means is installed on a position at which said flight path of said small-diameter ink droplets and said flight path of said large-diameter ink droplets are intercepted, and said control means varies the vibration exciting intensity in response to the recording electric signal so that said small-diameter ink droplets may be united with those large-diameter ink droplets that are necessary for the recording.

4. An ink jet printer according to claim 1, wherein said deflecting means includes at least one electrode positioned adjacent said ink stream so as to extend both upstream and downstream to a predetermined extent from said fore end part thereof and a DC power source for applying a DC voltage of fixed value to said electrode to charge said ink droplets and effect the necessary deflection thereof.

5. An ink jet printer according to claim 4, wherein said deflection means includes a single electrode positioned on one side of said stream.

6. An ink jet printer, comprising:

nozzle means for emitting pressurized ink in a stream towards a recording surface, an electromechanical transducer mounted on said nozzle, a high-frequency power source for applying to said electromechanical transducer a vibration exciting voltage so that the fore end of said ink stream spouted from said nozzle may sever alternately into large-diameter ink droplets and small-diameter ink droplets, a charging electrode positioned along the path of said stream to form an electrostatic capacitance with said ink stream, a charging DC power source for applying a DC voltage of fixed value between said charging electrode and the ink, deflecting electrodes positioned adjacent the flight paths of said ink droplets for causing a fixed electrostatic field to act on the ink droplets, a deflecting DC power source for applying a DC voltage of fixed value across said deflecting electrodes, shield means for intercepting the flight path of said small-diameter ink droplets and the flight path of united ink droplets formed when said large- and small-diameter ink droplets unite, means for generating a recording electric signal, and modulation means for varying the magnitude of said vibration exciting voltage in response to said recording electric signal, thereby to unite said small-diameter ink droplets during flight with those large-diameter ink droplets which are unnecessary for the recording.

7. An ink jet printer, comprising:

nozzle means for emitting pressurized ink in a stream towards a recording surface, an electromechanical transducer mounted on said nozzle, a high-frequency power source for applying to said electromechanical transducer a vibration exciting voltage so that the fore end of said ink stream spouted from said nozzle may sever alternately into large-diameter ink droplets and small-diameter ink droplets, a charging electrode positioned along the path of said stream to form an electrostatic capacitance with said ink stream, a charging DC power source for applying a DC voltage of fixed value between said charging electrode and the ink, deflecting electrodes positioned adjacent the flight paths of said ink droplets for causing a fixed electrostatic field to act on the ink droplets, a deflecting DC power source for applying a DC voltage of fixed value across said deflecting electrodes, shield means for intercepting the flight path of said small-diameter ink droplets and the flight path of said large-diameter ink droplets, means for generating a recording electric signal, and modulation means for varying a magnitude of said vibration exciting voltage in response to the recording electric signal, thereby to unite said small-diameter ink droplets during flight with those large-diameter ink droplets which are necessary for the recording, the united ink droplets being deflected along a different path than said small-diameter and large-diameter ink droplets by the deflecting electrostatic field.

* * * * *